Patented Mar. 31, 1931

1,798,175

UNITED STATES PATENT OFFICE

GEORGE FREDERICK SMITH, OF URBANA, ILLINOIS

DEHYDRATING AGENT AND PROCESS OF PREPARING IT

No Drawing.   Application filed September 13, 1926.   Serial No. 135,282.

This invention relates to dehydrating agents and to processes of preparing them.

Phosphorus pentoxide has hitherto been largely used in desiccators, as drying towers and tubes for absorbing moisture in spite of its high cost and its inability to absorb more than 10% of its weight of water. Moreover the cost of regenerating it as a dehydrating agent is prohibitive.

Magnesium perchlorate in one form or another has been used to replace phosphorus pentoxide, but is itself expensive, because difficult to prepare in granular form, and because as hitherto prepared it was a less rapid absorbent than phosphorus pentoxide, and therefore it was more essential to have in granular form. It absorbs water, however, when prepared as described below, rapidly enough to make it extemely efficient.

According to the present invention the magnesium perchlorate is associated with a material which makes it possible to obtain it and and to maintain it in granular form, and which may play the part of a carrier. The carrier itself may be a dehydrating agent. In the form of the invention herein illustrated in detail the magnesium perchlorate is associated with barium perchlorate which itself has been found to be a useful dehydrating agent.

It has been found possible to prepare by several different methods granular compositions containing both barium perchlorate and magnesium perchlorate which are as efficient as phosphorus pentoxide and which were capable of regeneration at low cost for further use as dehydrators.

Barium perchlorate is by far the most stable of the alkaline earth metal perchlorates, long heating at 400° C. being insufficient to appreciably decompose it. As a result of this property it becomes a stabilizer for the magnesium perchlorate which it carries and which is less stable.

Barium perchlorate has been cheaply prepared by roasting barium oxide with ammonium perchlorate or by boiling the two together. It has been found sufficient to heat barium hydroxide crystallized with eight molecules of water with crystals of ammonium perchlorate,—the water of crystallization sufficing for the latter reaction.

*Example 1.*—An efficient composition containing more of the barium salt than of the magnesium salt has been obtained by mixing proper proportions of crystals of proper size of trihydrate of barium perchlorate with crystals of proper size of hexahydrate of magnesium perchlorate and drying at either atmospheric or reduced pressure at 250° C. to 300° C. to yield a porous granular material.

*Example 2.*—Anhydrous barium perchlorate, obtained as by drying at temperatures up to 400° C., is sprayed with a solution of magnesium perchlorate or is mixed with the magnesium perchlorate which is in the form of the hexahydrate or the partially dried hexahydrate, and the resulting mixture dried at temperatures up to 300° C. and at ordinary or reduced pressure to yield the desired material. This procedure using 25% of the magnesium salt yielded a product more efficient than phosphorus pentoxide. A drying tube one inch in diameter and twelve inches long filled with this product proved capable of drying a stream of air 60% saturated with moisture at 28° to 30° C., flowing at the rate of fifty liters per hour, so that each liter of dried air contained less than one hundredth milligram of moisture. The test ran for a period in excess of twelve hours. During this time the desiccant, which weighed 104 grams at the start, gained 10.5 grams and but three inches of the twelve showed any deterioration. The spent reagent was in condition for regeneration and reuse. This data gives the absorption capacity for this material as 44%.

*Example 3.*—A solution containing both barium and magnesium perchlorate in the desired proportions may be evaporated to yield mixed crystals of these salts, and these dried to yield the desired product as in Example 1.

*Example 4.*—Magnesium perchlorate, either anhydrous or as trihydrate, is mixed with the trihydrate of barium perchlorate and dried either in a vacuum or at atmospheric pressure, the water of crystallization plus that either occluded or adsorbed by the latter furnishing sufficient moisture to yield the desired form of product.

By properly controlling the conditions, as by drying at 180° C. to 300° C. at atmospheric pressure or under reduced pressure it is possible to obtain a granular product admirably adapted for dehydrating purposes. This drying may be done, on a ten-mesh nichrome or other wire gauze, with little loss in powder form.

A granular material containing from 65% to 80% barium perchlorate and balance magnesium perchlorate has been found satisfactory. The granular material is very light, and resists abrasion well, so that it can be shipped even by mail with substantially no loss of efficiency. Both the perchlorates present serve as dehydrators. The material was found to absorb effectively from 30% to 60% of its weight of water, and was then capable of being dried and restored to its original efficiency, retaining its granular form.

It is useful for drying practically all ordinary gases. It will absorb from 5% to 20% of ammonia gas even at low pressures,—liberating it at 100° C. It is similarly effective on volatile amines.

Dehydrating material may be prepared by crushing the natural carbonate called magnesite and containing some calcium, partially neutralizing the carbonates by the addition of perchloric acid, and drying at a suitable elevated temperature in vacuum. In this material the calcium salt plays the part of the barium salt above described, and the magnesite remaining undecomposed or partly in the form of oxide forms a porous base.

Dehydrating material may also be prepared by depositing the perchlorate upon a suitable non-dehydrating base such as infusorial earth, unglazed porcelain, or on suitably fabricated granular silica absorbent.

Having thus described certain embodiments of my invention, what I claim is:

1. The process of preparing a dehydrating material which consists in bringing together barium perchlorate and magnesium perchlorate in the presence of available moisture and drying to form a granular material.

2. The process of preparing a dehydrating material which consists in bringing together magnesium perchlorate and a carrier for it so as to deposit the magnesium perchlorate on the carrier.

3. The process of preparing a dehydrating material which consists in bringing together magnesium perchlorate carrying available moisture and a larger amount of barium perchlorate and drying to form a granular material.

4. A granular dehydrating material consisting of magnesium perchlorate associated with a material which maintains it in granular form.

5. A granular dehydrating material consisting of magnesium perchlorate and a carrier for it also serving as a dehydrator.

6. A granular dehydrating material consisting of magnesium perchlorate carried by another perchlorate.

7. A dehydrating material consisting of a mixture of anhydrous magnesium and barium perchlorates.

8. A granular dehydrating material consisting of magnesium perchlorate carried by barium perchlorate.

9. A porous granular dehydrating material consisting of magnesium perchlorate carried by a larger amount of barium perchlorate.

10. A dehydrating material consisting of magnesium perchlorate carried by about ried by a larger amount of barium perchlorate.

11. A wholly granular dehydrating agent dependent for its efficacy upon anhydrous magnesium perchlorate, and a relatively ineffective material carrying the magnesium perchlorate.

Signed at Urbana, in the county of Champaign and State of Illinois, this 9th day of September, A. D. 1926.

GEORGE FREDERICK SMITH.